United States Patent [19]

Gay et al.

[11] Patent Number: 5,210,873

[45] Date of Patent: May 11, 1993

[54] REAL-TIME COMPUTER SYSTEM WITH MULTITASKING SUPERVISOR FOR BUILDING ACCESS CONTROL OR THE LIKE

[75] Inventors: Kirk W. Gay, Grand Prairie; Dan Selari, Grapevine, both of Tex.

[73] Assignee: CSI Control Systems International, Inc., Carrollton, Tex.

[21] Appl. No.: 529,227

[22] Filed: May 25, 1990

[51] Int. Cl.$^5$ .......................... G06F 9/38; G06F 9/46
[52] U.S. Cl. .............................. 395/650; 364/DIG. 1; 364/281.4; 364/281.7
[58] Field of Search .......................................... 395/650

[56] References Cited

U.S. PATENT DOCUMENTS

| | | | |
|---|---|---|---|
| 3,857,018 | 12/1974 | Stark et al. | 235/61.7 B |
| 4,545,016 | 10/1985 | Berger | 364/200 |
| 4,636,947 | 1/1987 | Ward | 364/200 |
| 4,689,610 | 8/1987 | Dietrich | 340/515 |
| 4,788,647 | 11/1988 | McManus et al. | 364/494 |
| 4,847,751 | 7/1989 | Nakade et al. | 364/200 |

Primary Examiner—Gareth D. Shaw
Assistant Examiner—A. Katbab
Attorney, Agent, or Firm—David L. McCombs

[57] ABSTRACT

A method is disclosed for providing a single-tasking disk operating system with multitasking capability in a real-time computer system for building access control or the like. A number of reentrant, terminate-and-stay-resident application programs are loaded into a host microcomputer. As each application program loads, it passes its unique code segment and instruction pointer parameters to a look up table. For the last application program to be loaded, the program segment prefix of the application program residing in the disk operating system is copied and stored. When a timer interrupt prompts the program switching logic, the code segment and instruction pointer parameters of the then-executing program are compared with the values in the look-up table. If no match is found, program switching is postponed. If a match occurs indicating one of the application programs is then executing, a switch is permitted if the current program segment prefix matches the stored copy, thus providing fast switching when permissible.

3 Claims, 3 Drawing Sheets

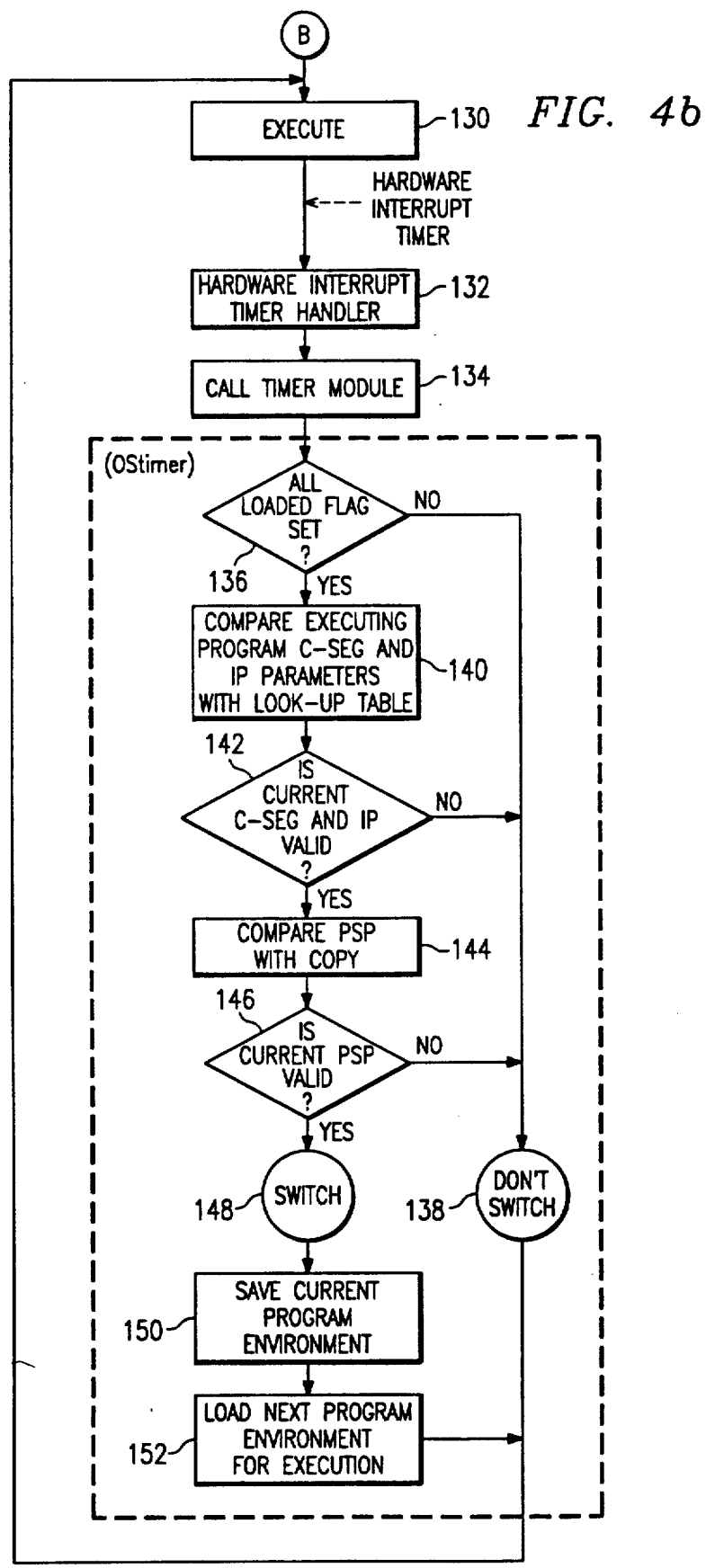

REAL-TIME COMPUTER SYSTEM WITH MULTITASKING SUPERVISOR FOR BUILDING ACCESS CONTROL OR THE LIKE

DESCRIPTION

A portion of the disclosure of this patent document contains material which is subject to copyright protection. The copyright owner has no objection to the facsimile reproduction by anyone of this patent document or the patent disclosure, as it appears in the Patent and Trademark Office patent file or records, but otherwise reserves all copyright rights whatsoever.

TECHNICAL FIELD

The present invention relates generally to real time computer control systems and particularly to such a system having a multitasking computer operating system supervisor.

BACKGROUND OF THE INVENTION

Real time computer control systems are those which are required to perform input/output with an external environment subject to certain time constraints (usually on the order of seconds or less) which must be met consistently. Such real-time computer control systems have been developed for a wide variety of applications with improved performance capabilities. However, these systems have, to a large extent, not been commercially practical due to the sophistication of computer hardware and/or software necessary to carry out their functions.

For example, there is a continuing need for expandable, integrated security systems to provide intelligent access control for doorways, elevators and other entry/exit points in commercial and residential buildings, parking garages and the like. Typically, such systems employ distributed hardware controllers or processing units for controlling the operation of a number of peripheral devices such as readers, lock actuators, sensors, alarms and other equipment. The multiple controllers are connected to a central host computer for collecting and processing information, executing operator commands and performing other functions to provide a fully integrated system. Remote site controllers operating at distant facilities may also be connected to the host computer using standard telephone lines.

In order to provide for adequate real-time performance and system expandability, known access control systems of the type described have relied on the use of relatively powerful 16-bit or 32-bit microprocessor minicomputers as the host in cooperation with sophisticated multitasking operating systems such as those marketed under the tradenames UNIX or XENIX. As referred to herein, a multitasking operating system is one that guides a computer in performing real time operations on a number of computer programs or "tasks" residing in the computer's memory. The attention of the central processing unit (CPU) moves rapidly among the tasks, spending just a short period executing code for one task before switching to another so that the tasks appear to be executing simultaneously. Since it is understood that the task execution is not truly simultaneous, the foregoing is most accurately referred to as concurrent execution. While multitasking operating systems of this type provide for multiple concurrent data processing and communication functions necessary for the operation of the access control system, they have the disadvantage of being relatively expensive and, further, are inefficient in their utilization of memory space.

Microcomputers or personal computers (PC's) having 8-bit microprocessors have become increasingly available and in many instances represent an economical alternative to the more powerful minicomputers described above. Industry standard architecture (ISA) microcomputers such as a basic IBM-compatible AT-PC typically are driven by single user disk operating systems (DOS) such as those available under the trade names MS DOS or PC DOS. The single-user disk operating system is by design single-tasking in operation and therefore is not well suited to handle the real time processing and user interface requirements of distributed access control and other systems.

Techniques are known for providing single tasking disk operating systems with limited concurrent processing capability, typically in a "windows" operating environment in which nonpreemptive task switching is supported by the application software, or otherwise in accordance with application-specific techniques that permit switching among terminate-and-stay-resident (TSR) programs tied to the underlying system's internal flag registers. These so-called multitasking shells or schedulers use the disk operating system for services and, for example, may be tied to use of the MS DOS InDOS flag for making time-slice task switching decisions. The decision to switch from one task to another is initially made by the shell and then logically gated together with the flag, so that the final task switch decision is made by MS DOS. The described multitasking shells are thus inadequate since their time slice task switching decisions are dependent upon logic which may become complex, is not responsive in terms of the real-time operations required, or is otherwise unreliable. Further, such known shells typically require significant memory space and cannot be efficiently accommodated within the system memory constraints which are standard in the PC environment.

SUMMARY OF THE INVENTION

It is therefore an object of the present invention to provide an improved real time computer control system in which a microcomputer having a single tasking disk operator system is supported for multitasking processing capability.

It is a further object of the present invention to provide an improved control system of the above type in which time-slice task switching decisions for the disk operating system are made based on the identity of the then executing program.

It is a still further object of the present invention to provide an improved control system of the above type in which a supervisor for providing multitasking capability occupies a minimal amount of memory space.

The foregoing and other objects are achieved as is now described. A number of reentrant terminate-and-stay-resident (TSR) application programs are loaded into a microcomputer of the control system. As each application program loads, it passes its unique code segment and instruction pointer parameters to a look up table located in the microcomputer s memory. For the last application program to be loaded, the program segment prefix (PSP) of the application program residing in the disk operating system is copied and stored in a location of memory. When a timer interrupt occurs indicating a decision is to be made whether to switch to execution of another program, the code segment and instruction pointer parameters of the then executing program are compared with the look up table previously generated. If no match is found thus indicating one of the reentrant application programs is not currently being executed, no switch occurs. If a match is found, the current program segment prefix is then compared with the previously stored copy. If the program segment prefix matches the copy, a program switch is implemented.

BRIEF DESCRIPTION OF THE DRAWINGS

The novel features believed characteristic of the present invention are set forth in the appended claims. The invention itself, however, as well as other features and advantages thereof, will best be understood by reference to the following detailed description of an illustrative embodiment when read in conjunction with the accompanying figures, wherein:

FIGS. 4a–4b depict a detailed flowchart illustrating the method of the present invention.

DESCRIPTION OF THE PREFERRED EMBODIMENT

Figure 1:
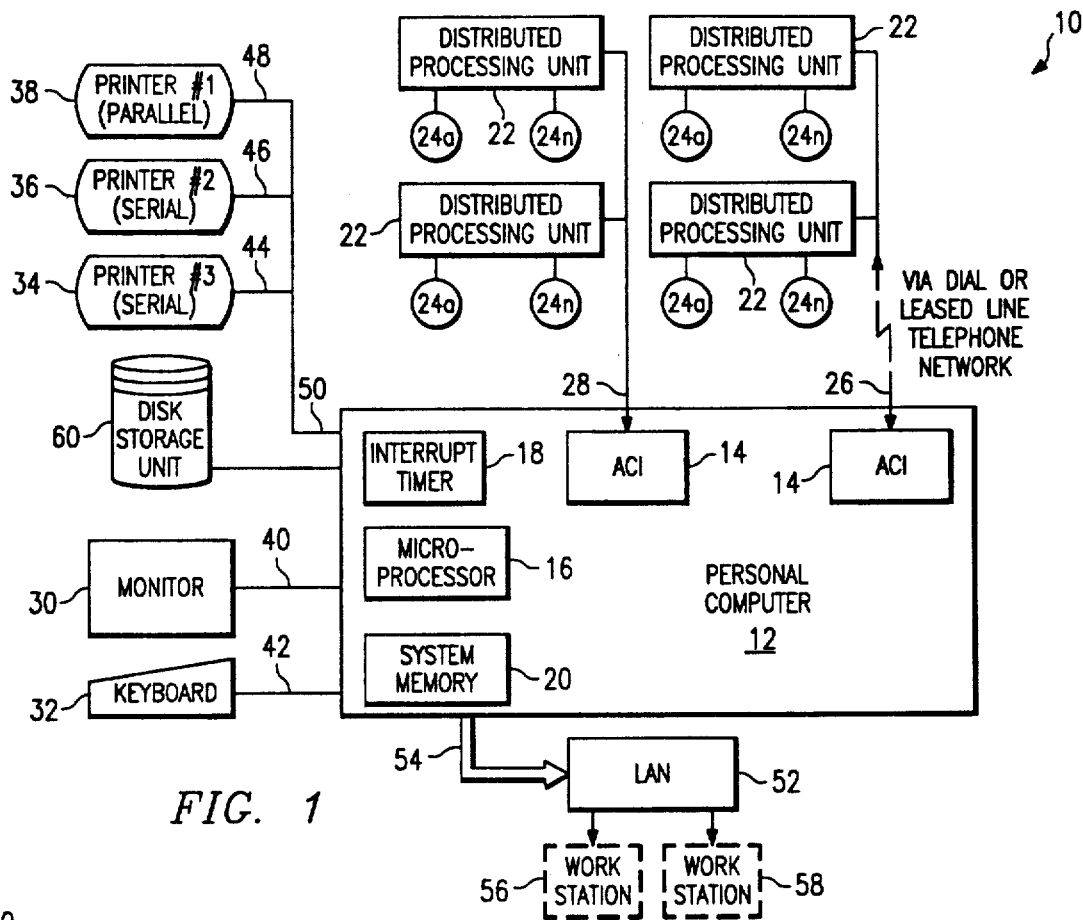
FIG. 1 depicts a block diagram of an access control system involving the present invention.

With reference now to the drawings wherein like reference characters designate like parts or steps throughout the several views, FIG. 1 is a block diagram of a building access control system 10 embodying features of the present invention. The system 10 includes a main processor 12 having a plurality of access control interface (ACI) cards 14, a central processing unit (CPU) 16, an interrupt timer 18, and a system memory 20. While not shown, it is understood that the components of the processor 12 are interconnected by a conventional internal bus architecture and packaged with the system board electronics of an industry standard architecture (ISA) microcomputer such as, for example, an IBM or IBM compatible AT personal computer.

A plurality of controllers or distributed processing units (DPU's) 22 are connected, as will be discussed, to each of the ACI cards 14 of the main processor 12. The DPU's 22 serve to provide intelligent access control for doorways, elevators and parking garages, for example, in multiple-tenant residential or commercial buildings or the like. To this end, a plurality of input/output or peripheral devices 24a-24n are connected to each of the DPU's 22. The peripheral devices 24a-24n include, inter alia, entry authorization devices, electrically operated locks, lock sensing contacts, door position indicators, alarms, motion detectors and other sensors. The entry authorization devices (not shown) may consist of, for example, numeric keypad or identification card readers or the like. Since the foregoing peripheral devices 24a-24n are well known, they will not be discussed further.

It is understood that the DPU's 22 are located at a distance from the main processor 12 in one or more multiple tenant residential or commercial buildings. An RS-485 asynchronous serial full duplex interface link 26 interconnects an ACI card 14 as shown to the DPU's 22 across a telecommunications network, representing a configuration in which the DPU's are located at one or more remote sites from the main processor 12. Although not shown modem and modem controllers are provided for effecting the transfer of information across the telecommunications network. An RS-485 asynchronous serial full duplex interface link 28 connects an ACI card 14 as shown to the DPU's 22, representing a configuration in which the DPU's are in the same building as the main processor 12 or are otherwise located sufficiently close to the processor to obviate the use of a telecommunications network.

While not shown, it is understood that each of the DPU's 22 includes a microprocessor, memory space and control logic for the localized and independent control of the respective peripheral devices 24a-24n. The main processor 12 monitors the activities of the DPU's 22 and updates their programming based on events occurring at any of the various access locations or at the direction of a user, as will be subsequently discussed.

A monitor 30, keyboard 32 and printers 34, 36 and 38 are connected to the main processor 12 to provide a user interface for the system 10. Lines 40 and 42 respectively connect the monitor 30 and keyboard 32 to the processor 12. Serial ports 44, 46 and parallel port 48 on line 50 connect the respective printers 34, 36 and 38 to the processor 12. A commercial local area network (LAN) 52 on a bus 54 is provided to expand the user interface capacity of the system 10. Stand-alone workstations 56 and 58 consisting of ISA microcomputers reside on the LAN 52. Although not shown, it is understood that one or more remote workstations also may be connected to the LAN 52 via a telecommunications network. The main processor 12 thus acts as a file server terminal as well as a workstation on the LAN 50. The user interface functions contemplated for the system 10 are discussed subsequently in detail.

A disk storage u it (DSU) 60 is connected on line 62 to the processor 12. The DSU 60 provides for high capacity random access storage of programs and data, subsequently discussed.

The ACI cards 14 perform a number of communications and data management functions for the processor 12 and the multiple DPU's 22 in order to minimize the load on the main processor 12. While not shown, it is understood that each of the ACI cards 14 comprises a number of processors such as the type 8031 available from Intel Corporation, and a plurality of buffers and driver circuits configured in a manner known to those skilled in the art. Communications between the processor 12 and the ACI cards 14 are handled via message/command transfers passed through a common shared memory array residing on each ACI card and occupying contiguous memory space in the system memory 20, as will be described later. The ACI cards 14 communicate with the main processor 12 over the processor's internal bus (not shown). Among the functions of the ACI cards 14 are the handling of communications with the DPU's 22, the control of communications priorities based on parameters from the main processor 12, the acceptance and processing of the main processor command requests, the interrogation of the DPU's and collection of transaction and event history information from the DPU's, and notification and transfer of such information to the main processor.

Though not meant to be limiting, in a preferred embodiment of the system 12 up to four ACI cards 14 having two channels per card are added as printed circuit boards (PCB's) to the processor 12 for providing eight channels of I/O activity over which to monitor and program activities of the DPU's 22. Each of the ACI channels will support up to 32 of the DPU's 22 which in turn will support over five hundred peripheral devices 24a-24n. The system 10 may initially include a single ACI card 14 for supporting a limited number of the DPU's 22, and be expanded later to include additional cards 14, DPU's and equipment for networking with a number of other work stations.

Figure 2:
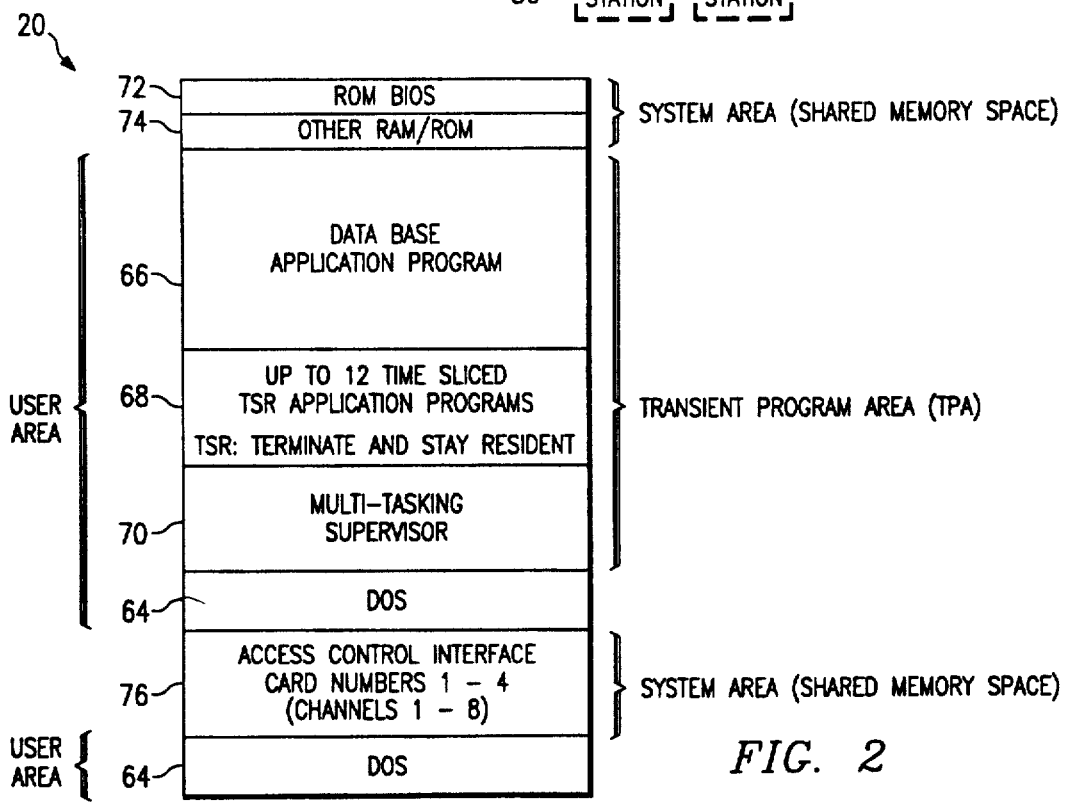
FIG. 2 depicts a memory map of the main processor system memory shown in FIG. 1.

Referring now to FIG. 2, there is depicted a physical memory map for the system memory 20 which illustrates the allocation of memory space among application and operating system routines or programs for the processor 12. In the PC environment, the CPU 16 can address a total of one (1) megabyte of memory space. The first ten segments of the memory 20 are referred to as the user area and comprise six hundred forty (640) kilobytes of memory space. The 640-kilobyte area is occupied by a disk operating system 64, a data base 66, application program 66, application programs 68 and a multitasking supervisor 70. The remaining six segments of memory space, which total three hundred eighty four (384) kilobytes, are referred to as the system area, discussed later.

The DOS 64 is a single-user, single-tasking disk operating system such as that commercially available from Microsoft Corporation as MS-DOS Version 3.3, although other MS DOS or IBM PC-DOS versions may be utilized. The DOS 64 is loaded into the locations of memory as shown, for managing the basic operating functions of the processor 12. It is understood that the DOS 64 includes a command processor which is a module of the DOS that is responsible for, inter alia, issuing prompts to the user, interpreting commands, loading and executing transient application programs, and interpreting batch files. The portion of the DOS 64 located in the lower section of the memory 20 includes the resident portion of a COMMAND.COM file of the command processor, which is responsible for handling program termination and any user program errors resulting in program termination. The portion of the DOS 64 located at the top of the memory 20 includes the transient portion of the COMMAND.COM file which provides the user's interface to the DOS 64. The DOS 64 is herein described generally, it being understood that any number of options may be specified by the user in the CONFIG.SYS, AUTOEXEC.BAT and other files. A user installable SHARE module may also be loaded as part of the DOS 64 which includes a code that supports file sharing and locking in a networking environment. Other network operating systems (NOS) may also be provided, as desired.

The database application program 66, the plurality of application programs 68 and the supervisor 70 occupy a portion of the memory 20 which is sometimes referred to as the transient program area (TPA). The program 66 is a standard single user database application. The programs 68 and the supervisor 70 are special purpose terminate-and stay-resident (TSR) programs. Generally, TSR programs are programs that make use of specific coding techniques to allow them to remain resident in computer random access memory (RAM) while other programs are loaded into other unused sections of the same RAM. Common programs which are not of the TSR variety are allowed to exist in computer RAM only one at a time. TSR programs include initialization code and resident code for late uses. In general TSR techniques were developed to accommodate "Hot Key" and "Interrupt Handler" driven programs. These programs, for example, provide phone directories, screen capture, date and time indications, auto answer modem support and other functions that can practically be allowed to interrupt the operation of nonreal time processes such as those performed in word processors and spread sheet programs.

The database application program 66 services user database access and editing, the creation of pull-down and pop up windows, the generation of files, and provides other operating environment and user interface features as may be required for the system 10.

The TSR application programs 68 perform functions such as the sorting of system 10 activity and alarm messages, operator notification of system alarm conditions and the download of user options into the DPU's 22, the maintenance of system wide date and time, the processing of anti passback actions, the processing of I/O mapping algorithms, and the display of real time system diagnostics. Since these functions are generally known to those skilled in the art, they are not discussed further. In the preferred embodiment, up to twelve time-sliced TSR application programs 68 may be implemented in the system 10.

According to the present invention, the supervisor 70 monitors the execution of the program 66 and the programs 68 by the CPU 16 for controlling the time slice task switching among the programs in cooperation with the DOS 64, in order to provide the processor 12 with real time concurrent processing and communications capability. The supervisor 70 also provides messaging services for information transfer between the programs 66, 68 and the remainder of the system 10. The operation of the supervisor 70 is discussed subsequently in detail.

The system area of the memory 20 is reserved for use by a read only memory (ROM) monitor or ROM basic input/output system (BIOS) 72, a memory block 74 and a memory block 76. The ROM BIOS 72 provides the fundamental services that are needed for operation of the processor 12. The block 74 represents other random-access memory (RAM) and read-only memory (ROM) space for storing other miscellaneous information which, with the ROM BIOS 72, is understood to comprise shared memory space located within the system memory 20 and with other add-in printed circuit boards (PCB's), not shown. The block 76 represents RAM memory space which is shared with RAM memory space (not shown) on the ACI cards 14.

It should be noted that the memory map of FIG. 2 is not intended to be scale but is shown only for the purpose of identifying relevant sections of the memory 20 and the relative positioning of those sections. There are also a number of memory sections or elements which are not shown that have designated memory blocks Since MS/PC DOS user memory utilization is well known to those skilled in the art, the foregoing arrangement need not be described in further detail.

Figure 3:
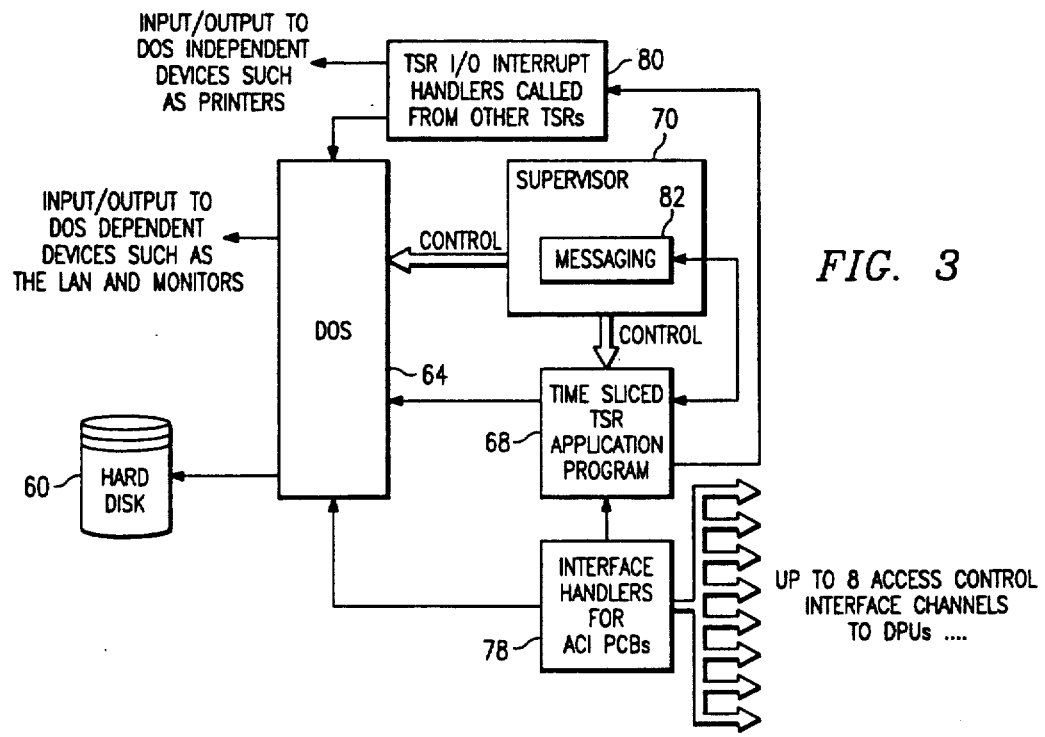
FIG. 3 depicts a functional block diagram of the software architecture for the system shown in FIG. 1.

FIG. 3 depicts a functional block diagram of the software architecture for the system 10. The disk storage unit 60 input/output functions are handled through calls to the DOS 64 software interrupts (subsequently described). ACI interface handlers 78 are interrupt service routines (ISR) which pass commands, data and program information from the TSR programs 68 to the ACI cards 14 which then forward the same to the DPU's 22. These direct operations are executed on a separate timer interrupt and are given the highest priority of any operation of the processor 12. The ACI card 14 direct read/write operations will preempt the multitasking switching between the programs 68, since the real-time monitoring of the DPU's 22 is the primary task of the system 10. I/O Handlers 80 are interrupt service routines (ISR) which are called by the TSR application programs 68 to perform input/output to peripheral devices such as printers, etc., other than the DSU 60. As with the ACI interface handlers 78, these ISR's take precedence over the concurrent processing switching operations between the programs 68. Thus, information output to the printers 34, 36 and 38 is handled independently of the DOS 64 while input/output activities for the LAN 52, the monitor 30 and the monitors of the workstations 56, 58 are controlled through the DOS 64.

The supervisor 70 controls the switching of the application programs 68 into and out of the execution registers of the CPU 16 (FIG. 1) so that real-time concurrent processing occurs, yet switching is postponed at times when calls to DOS software interrupts and other priority ISR's or nonreentrant programs are being serviced. The logic of the present invention for making the fast switching decisions is subsequently described with reference to FIG. 4.

A messaging module 82 is provided as a portion of the supervisor 70 for providing data transfer and communications between the programs 68. Since the functions of the messaging module 82 are provided using standard techniques it need not be described further.

In operation of the system 10, the various peripheral devices (FIG. 1) are controlled locally by the DPU's 22 in the performance of entry/exit, sensing, alarm and other functions. The DPU's 22 are connected as previously described to the main processor 12 and other input/output devices including the workstations 56, 58. The particular interactive and user interface functions of the integrated system 10 are implemented by the processor 12 according to the instructions of the data base and the application programs 66, 68.

The DOS 64 is responsible for all movement of data and programs to and from the disk storage unit (DSU) 60 and for the dynamic management of the system memory 20 during loading and execution of programs. As originally designed for the PC, a single-tasking disk operating system such as the DOS 64 was intended to govern the operation of one program at a time by a single user. In order to enable a user to invoke the many input/output (I/O) services provided by the DOS 64, the DOS includes a software interrupt structure The software interrupt structure invokes interrupt (INT) instructions through the execution of software as opposed to hardware action for giving programs access to system functions. Accordingly, a particular I/O service or program of the DOS 64 may be invoked by loading the appropriate software interrupt hexadecimal number into the environment registers (not shown) of the processor 12, and then executing an interrupt (INT) instruction. The software interrupts are entries into sections of code that reside in the portion of RAM memory occupied by the DOS 64 as shown in FIG. 2.

A detailed discussion of versionspecific information on operating system nomenclature, commands, utilities, system calls and other useful information on assembly language programming for the customization of commercially available operating systems such as MS-DOS can be found in *The MS-DOS Encyclopedia*, Microsoft Press, 1988, incorporated herein by reference.

DOS interrupt 21H or its function call equivalent is the main source of DOS 64 services. The interrupt 21H functions are implemented by placing a function number in the AH register, placing any necessary parameters in other registers, and issuing an INT 21H instruction. The sections of the DOS 64 code entered by a DOS software interrupt are nonreentrant programs. That is, once a DOS software interrupt has been invoked, the section of the code entered and being executed by the CPU 16 may not be suspended and exited for the purpose of allowing the CPU to switch to enter another task, until execution has completed. "Fast" switching between tasks demanding service necessary to enable concurrent processing is therefore not possible when a DOS software interrupt invoking the DOS 64 I/O services is in progress.

A feature of the commercially available versions of the DOS 64 is a one byte flag which monitors the status of the DOS software interrupts and is incremented each time an interrupt 21H function is invoked and decremented when the function terminates. The one-byte flag is referred to commercially as the InDOS flag. It has been known to use the InDOS flag to provide limited multitasking capability for certain applications. Thus, when a DOS software interrupt is in progress, the InDOS flag is incremented to indicate that nonreentrant code is being executed and task switching should not be invoked. When the DOS soft interrupt 21H function has completed, the status of the InDOS flag is decremented to indicate that switching may now take place among the tasks competing for the CPU 16.

While the InDOS flag provides a technique for providing some degree of concurrent processing while still allowing use of the DOS 64 for I/O services, there are a number of shortcomings associated with use of the InDOS flag for this purpose. For example, the InDOS flag only monitors the status of interrupt 21H relating to DOS function calls. Other ROM BIOS 62 interrupts relating to defined categories of video I/O services and disk I/O services (referred to as interrupts 10H and 13H, respectively) also represent nonreentrant sections of code, the status of which must be monitored separately by other means before task switching can be invoked, thus delaying the switching decision. Also, the InDOS flag itself has been known to yield false indications when a network operating system is loaded with the DOS 64 and therefore may not always provide a reliable criteria on which to base a switching decision. Further, the response time of the InDOS flag is inherently slow in providing a status indication for enabling a switch in the real time processing environment contemplated by the system 10.

Figure 4A:
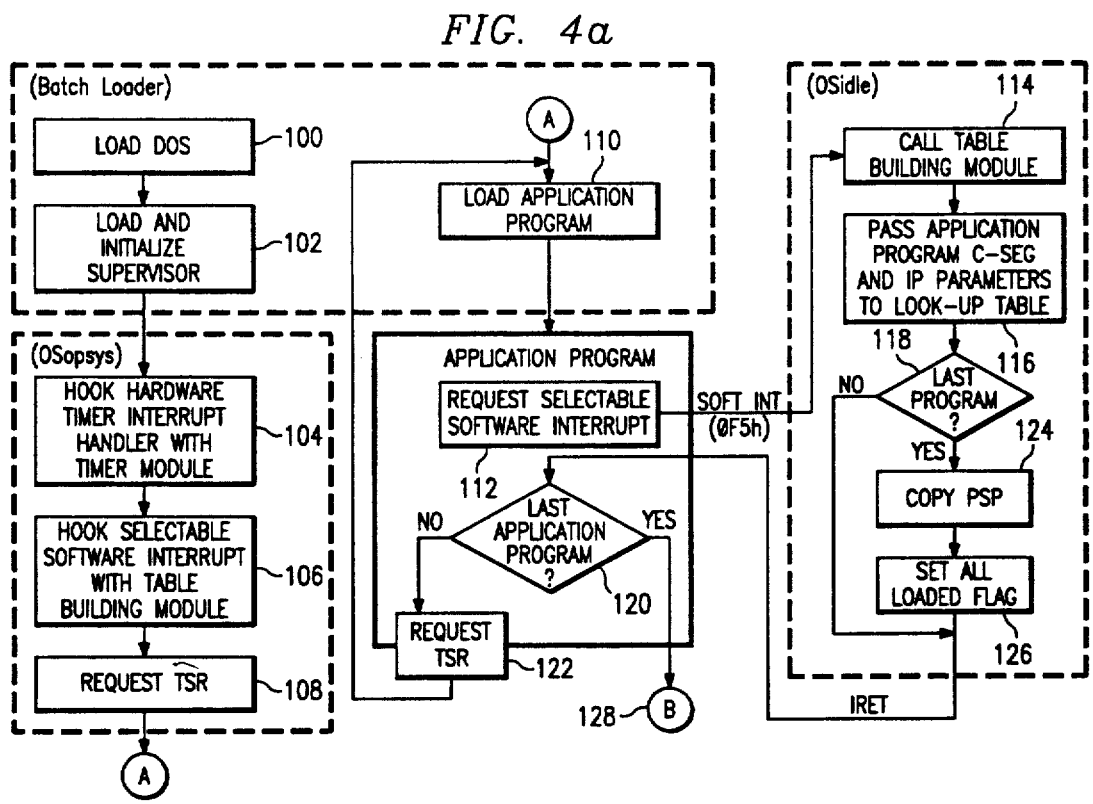

Referring to FIGS. 4a-4b of the drawings, a flowchart diagram is shown detailing the method according to the present invention for implementing improved concurrent processing or multitasking. In FIG. 4a at step 100, the DOS 64 is loaded into the processor 12. Other network operating systems (NOS) such as that known commercially by the tradename AXON, for example, may also be loaded according to the requirements of the system 10.

The loading of the supervisor 70 and programs 68 which are to be described may be accomplished using batch file loading procedures. At step 102, the supervisor 70 is loaded and initialized. An initialization routine of the supervisor 70 performs the usual initialization functions for a TSR program and further sets or "hooks" a number of interrupt vectors to specific procedures or modules of the supervisor By hooking the interrupt vectors, the interrupt handlers or interrupt service routines associated with the vectors can be intercepted, temporarily acted upon by the relevant module of the supervisor 70, then passed on to the original Interrupt Service Routine (ISR) for normal handling. Accordingly, at step 104, hardware timer interrupt 08H is hooked with a timing module of the supervisor 70. The operation of the timing module is described subsequently in detail. The hardware interrupt 08H is a timer tick interrupt instruction generated by the interrupt timer 18 of the processor 12 and in most standard PC's, is activated every 54 milliseconds (18.2 times per second). In this manner, each time an Int 08H instruction is requested the logic of the timer module is executed and decisions are made on whether to switch programs, as will be discussed. At step 106 a user selectable software interrupt is hooked with a table building module of the supervisor 70. The software interrupt has an instruction reference INT 0F5h, and is requested for each application program 68 during its loading procedure, described below. When the user selectable interrupt is requested, the logic of the table building module is executed. The table building module is discussed subsequently in detail. Initialization of the supervisor 70 is completed at step 108 when a request for a terminate and stay resident function is invoked.

The method continues at step 110 wherein the first of the application programs 68 is loaded. The user selectable software interrupt instruction is requested for the loading program 68 at step 112. At step 114, the table building module of the supervisor 70 is thus called and executed. At step 116, the logic of the table building module obtains the code segment and instruction pointer (offset) parameters which are unique to the application program 68 and passes them to a look up table for storage in memory. It is understood that microprocessors such as the CPU 16 include segment registers which hold the starting addresses of certain segments in computer memory, and offset registers which identify locations in the segments. The code segment (C-SEG) register locates the code segment, which contains the program that is being executed. The instruction pointer (also called the program counter), provides the offset address within the code segment where the current program is executing. Together the C-SEG and IP registers track the complete address of a memory location and the exact location of the next instruction to be executed.

At step 118, an inquiry is made to determine whether the program 68 being loaded is the last program to be loaded. If the inquiry at step 118 is negative, the table building module executes an IRET return instruction. If the program 68 is the last program executing as now determined at step 120, the method proceeds as will be subsequently discussed with reference to FIG. 4b. If the program 68 at step 120 is not the last program the method continues at step 122 where a terminate and stay-resident function is invoked. The method then returns to step 110 and begins loading the next application program 68. The foregoing process continues until the inquiry at step 118 is positive, indicating that the last application program 68 is now loading. At step 124, the program segment prefix (PSP) for the last program 68 occupying memory space of the DOS 64 is copied and stored in a separate location of the memory 20. The PSP is a special page of memory (usually 256 bytes) built by the DOS 64 in front of all programs (.EXE or .COM formats) when they are loaded into the memory 20, and contains several fields of information used as a control block for running the program. Thus, the DOS 64 uses the PSP to keep track of certain data unique to the program, including command line parameters and the segment address of the programs environment. It is understood that the DOS 64 only maintains the PSP for the previous program. When the last program 68 is loaded, its PSP is left in control of the DOS 64. Thus, upon execution of each of the programs 68 the same PSP will reside in the DOS 64. When other network or DOS related operations are performed, the PSP may sometimes be manipulated or temporarily altered, but is then replaced intact when such operation is completed.

Since all of the application programs 68 have now been loaded, at step 126 an "all loaded" flag is incremented to indicate such. Since the decision at step 120 is now positive, the method continues at step 128 whereby the last program loaded begins to execute in a "dead man" loop until the next hardware timer interrupt moves execution to step 130 as described in FIG. 4b.

Referring now to FIG. 4b, the CPU 16 begins execution at step 130. The hardware interrupt timer 18 provides a hardware interrupt to the CPU 16 every 54 milliseconds, as previously described. An interrupt instruction INT 08H invokes the hardware interrupt timer handler at step 132 which is hooked to the timer module of the supervisor 70. Thus, at step 134 the timer interrupt module is called. If at step 136 the all loaded flag (previously discussed with reference to step 126) is not set, a decision is made not to switch out of the current program, as indicated by block 138, the method returns to step 130 for execution. If at step 136 the all loaded flag has been set, then at step 140 the logic of the timer interrupt module compares the code segment (C-SEG) and instruction pointer (IP) parameters of the then executing program with the parameters residing in the look-up table that were generated during loading of the application program 68 previously, at step 116. As indicated at step 142, an inquiry is made as to whether the C-SEG and IP parameters for the executing program are valid. Therefore, if the C-SEG and IP parameters match any of the C-SEG and IP parameters in the look up table, the answer to this inquiry is positive thus indicating that one of the reentrant TSR programs 68 are executing and a program switch would be appropriate. If the answer to the inquiry at step 142 is negative, this is an indication that a possibly nonreentrant operation such as a call to DOS or other interrupt service routine (ISR) or program is being executed, and a switch to another program should not occur. Accordingly, as indicated at block 138, the current program resumes execution at step 130. Although not shown, it is understood that instructions may be provided to prevent a program from dominating the processing time of the CPU 16 for more than a set number of cycles.

If the current C-SEG and IP parameters are determined to match values in the look up table at step 142, the method continues at step 144 by comparing the PSP associated with the foreground task with the copy of the original PSP stored in the memory previously at step 124. Since the PSP is sometimes modified when the network services or operations involving the DOS SHARE module are executing, an inquiry at step 146 as to whether the PSP is valid (i.e., it matches the copy) could be negative. Since such is not an appropriate time to switch programs, the method proceeds as shown at block 138 and no switch occurs. The method returns to step 130 for execution. If the inquiry at step 146 is positive, such that the foreground PSP and PSP copy match, then an instruction to switch is made at step 148.

When a switch at step 148 is indicated the logic of a switching module of the supervisor 70 is executed. At step 150, the method operates to push on the stack (or save) the currently executing program's environment. That is, the executing program's C-SEG, IP and other register parameters are saved. Since the program from which the switch is made has been determined by the logic to be one of the application programs 68, it is reentrant and may be suspended before completion without causing problems. At step 152, the next program environment to execute is loaded from the memory 20 into the CPU 16. Execution then commences as indicated at step 130.

It will be appreciated that the present invention can take many forms and embodiments. The embodiments shown herein are intended to illustrate, not limit the invention, it being understood that other real time control system environments are contemplated.

Preferably, the method for implementing concurrent processing according to the present invention is carried out by one or more computer programs. Each such program operates in a conventional manner to provide the above-described functions. In the preferred embodiment, the following assembly language source code may be used to control the method:

```
;[100]

comment*
======================================================================
module          OS_opsys description
      dos batch file loader:

OS_opsys        loads, starts execution at <init>
      prgm1           loads, starts execution at prgm's <init>
      prgm2              "         "           "
      prgm3              "         "           "
      prgm4              "         "           "

the batch loader loads [OS_opsys] which hooks vectors
   <OSidle> and <OStimer> (hardware timer interrupt 08h)
   then TSR's, thereby , returning to the batch file loader the batch file loader, then loads [prgm1] which via the
   hooked software interrupt <OSidle> passes it's:
        code segment
        stack and stack pointer
        starting address (instruction pointer)
   these parameters are saved by <OSidle> for switching
   [prgm1] then TSR's, thereby, returning to the batch loader.

the batch loader then loads [prgm2] which does as [prgm1]

the batch loader then loads [prgm3] which does as [prgm1]

the batch loader then loads [prgm4] which does as [prgm1]
   except it does not TSR. [prgm4. is the last program loaded
   and is allowed use of the remaining 640k memory.
   Since [prgm4] does not TSR, it does not return to the
   batch loader (the batch loader has done it's task and
   is no longer required)

Hence, the loaded program valid code segments are:
              [prgm1]'s code segment
                    thru
              09FFFh (end of 640k memory)

<OSidle> knowing that the last program has passed it's
   parameters, sets an all loaded flag that causes <OStimer>
   to begin switching programs ======================================================================
                                                            end*
```

```
comment *
]_____[procedure]_____]
 procedure     init    dos loader entry [100]

purpose       hook operating system vectors and TSR description
 entry
 exit
 notes
]_____
] * init    proc    far

;[102]
    push    es mov     ax,seg _DATA
    mov     ds,ax

;[104]
    ;----   vector hardware interrupt to OStimer mov     ah,35h
    mov     al,08h
    int     21h
    mov     word ptr cs:org08h,bx     ;off
    mov     word ptr cs:org08h+2,es   ;seg mov     ah,25h
    mov     al,08h
    mov     dx,seg _TEXT
    mov     ds,dx
    mov     dx,offset OStimer
    int     21h ;[106]
    ;----   set OSidle vector mov     ah,25h
    mov     al,0F5h
    mov     dx,seg _TEXT
    mov     ds,dx
    mov     dx,offset OSidle
    int     21h ;[108]
    ;----   TSR transient and stay resident pop     es mov     ax,sp               ;stack length in paragraphs
    mov     cl,4
    shr     ax,cl
    add     ax,1 mov     dx,ss               ;paragraphs PSP to STACK
```

```
        mov     cx,es                   ;es not changed from entry !!!
        sub     dx,cx add     dx,ax mov     ax,3100h
        int     21h init    endp comment *
]_____[procedure]_____
]                                                                          ]
 procedure      OSidle purpose        receive parameters needed by switcher from
                application programs description    upon being loaded by dos and before TSRing,
                the application program calls this procedure via
                soft interrupt passing the following parameters:
                        code segment
                        stack and stack pointer
                        starting address (instruction pointer)
                these parameters are saved for switching
 entry
 exit notes          ld_cnt inited to 0 upon power up
]_____
] *

;[114]

OSidle          proc    far push    es
        push    ds push    ax mov     ax,seg _DATA
        mov     ds,ax pop     ax inc     ld_cnt cmp     ld_cnt,1
        jne     ld_2

;[116]          save passed parameters mov     n01_ss,ss
                mov     n01_sp,sp
                mov     n01_cs,bx
                mov     n01_ip,ax
                mov     n01_mail_box_ds,dx
                mov     n01_mail_box_off,cx
```

```
        ld_2:
        cmp     ld_cnt,2
        jne     ld_3
                mov     n02_ss,ss
                mov     n02_sp,sp
                mov     n02_cs,bx
                mov     n02_ip,ax
                mov     n02_mail_box_ds,dx
                mov     n02_mail_box_off,cx ld_3:
        cmp     ld_cnt,3
        jne     ld_4
                mov     n03_ss,ss
                mov     n03_sp,sp
                mov     n03_cs,bx
                mov     n03_ip,ax
                mov     n03_mail_box_ds,dx
                mov     n03_mail_box_off,cx ld_4:
        cmp     ld_cnt,4
        jne     OSidle_last
                mov     n04_ss,ss
                mov     n04_sp,sp
                mov     n04_cs,bx
                mov     n04_ip,ax
                mov     n04_mail_box_ds,dx
                mov     n04_mail_box_off,cx OSidle_last:

;[118]           if last program loaded,
;                    save it's psp
;                    set all loaded flag cmp     ld_cnt, last_slot
                jne     OSidle_exit ;[124]
                push    ax
                push    bx
                        mov     ah, 51h     ; save last slot psp
                        int     21h
                        mov     cs:last_psp, bx
                pop     bx
                pop     ax cli
;[126]
                mov     cs:all_loaded, 1

OSidle_exit:
                pop     ds
                pop     es iret

OSidle   endp
```

```
comment *
_____[procedure]_____
]                                                                 ]
 procedure      OStimer
 purpose
 description    <init> vectored hardware interrupt 08h
                to this procedure
 entry
 exit
 notes
]_____
] *

OStimer             proc    far

;----   save caller's code segment pop     cs:OSt_flags
            pop     cs:OSt_cs push    cs:OSt_cs
            push    cs:OSt_flags ;-----  chain to (call) org vector pushf
            call    cs:org08h cli ;[136]
            ;----   if all time slots loaded, begin switching
            ;       else exit test    cs:all_loaded,00000001b
            jnz     OSt_01 jmp     OSt_null

OSt_01:     ;----   if slot switch time, set switch pending inc     cs:OSt_tick_cnt cmp     cs:OSt_tick_cnt,1
            ja      OSt_1
            mov     cs:OSt_sw_pending,1

OSt_1:      ;----   if not sys cs, exit

;[140]
            call    ck_cs
;[142]
            jc      OSt_null

;[144]
            ;----   get current psp known to dos
            ;       compare with psp used by programs
            ;       (all programs use last_psp)
            ;       exit if not same
```

```
        push    ax
        push    bx mov     ah, 50h         ;get psp
        int     21h cmp     last_psp, bx    ;compare pop     bx
        pop     ax
;[146]
        jne     OSt_null        ;exit if not equal ;----   if not switch pending
        ;       exit cmp     cs:OSt_sw_pending,0
        je      OSt_null jmp     OSt_switch

;[138]

OSt_null:
        iret

;--------------------------
        ;       SWITCH SLOTS
        ;--------------------------

;[148]

OSt_switch:

;----   save entry ss:ip mov     cs:OSt_ss_in,ss
        mov     cs:OSt_sp_in,sp ;----   use local stack mov     ss,cs:OSt_stack_seg
        mov     sp,offset cs:OSt_sp ;[150]
        ;----   save entry regs mov     cs:ax_in,ax
        mov     cs:bx_in,bx
        mov     cs:cx_in,cx
        mov     cs:dx_in,dx
        mov     cs:ds_in,ds
        mov     cs:es_in,es
        mov     cs:di_in,di
        mov     cs:si_in,si
        mov     cs:bp_in,bp ;----   use local data seg
```

```
        mov     ax,_DATA
        mov     ds,ax

;----   reset tick cntr
        ;       give this next slot it's full time mov     cs:OSt_tick_cnt,0

;----   clear switch pending mov     cs:OSt_sw_pending,0

;----   handle slot counter mov     al,OSt_slot_cnt         ;save current slot #
        mov     OSt_slot_in,al inc     OSt_slot_cnt cmp     OSt_slot_cnt,last_slot jbe     OSt_sw1
                mov     OSt_slot_cnt,1
;[152]

OSt_sw1:        ;------ slot 1 cmp     OSt_slot_cnt,01
        jne     OSt_slot_2

;----   not active (not running) slot 1 cmp     n01_act,0
                jne     OSt_n01_act call    OSt_save

;mark active mov     n01_act,1

;start slot 1 mov     ss,n01_ss
                mov     sp,n01_sp push    n01_cs
                push    n01_ip sti
                ret     2

;----   active  slot 1

OSt_n01_act:

call    OSt_save

; restore regs
                mov     ss,n01_ss
                mov     sp,n01_sp
```

```
        mov     ax,n01_ax
        mov     bx,n01_bx
        mov     cx,n01_cx
        mov     dx,n01_dx
        mov     es,n01_es
        mov     di,n01_di
        mov     si,n01_si
        mov     bp,n01_bp
        mov     ds,n01_ds       ;must be last iret ;------ slot 2

OSt_slot_2:

cmp     OSt_slot_cnt,02
jne     OSt_slot_3

;----   not active (not running) slot 2 cmp     n02_act,0
        jne     OSt_n02_act call    OSt_save mov     n02_act,1 mov     ss,n02_ss
        mov     sp,n02_sp push    n02_cs
        push    n02_ip sti
        ret     2

;----   active slot 2

OSt_n02_act:

call    OSt_save

; restore regs mov     ss,n02_ss
        mov     sp,n02_sp
        mov     ax,n02_ax
        mov     bx,n02_bx
        mov     cx,n02_cx
        mov     dx,n02_dx
        mov     es,n02_es
        mov     di,n02_di
        mov     si,n02_si
        mov     bp,n02_bp
        mov     ds,n02_ds       ;must be last iret ;------ slot 3
```

```
OSt_slot_3:

cmp     OSt_slot_cnt,03
jne     OSt_slot_4

;----   not active (not running) slot 2 cmp     n03_act,0
        jne     OSt_n03_act call    OSt_save mov     n03_act,1 mov     ss,n03_ss
        mov     sp,n03_sp push    n03_cs
        push    n03_ip sti
        ret     2

;----   active slot 3

OSt_n03_act:

call    OSt_save

; restore regs mov     ss,n03_ss
        mov     sp,n03_sp mov     ax,n03_ax
        mov     bx,n03_bx
        mov     cx,n03_cx
        mov     dx,n03_dx
        mov     es,n03_es
        mov     di,n03_di
        mov     si,n03_si
        mov     bp,n03_bp
        mov     ds,n03_ds       ;must be last iret ;------ slot 4

OSt_slot_4:

cmp     OSt_slot_cnt,04
jne     OSt_slot_end

;----   not active (not running) slot 4 cmp     n04_act,0
        jne     OSt_n04_act
```

```
            call    OSt_save mov     n04_act,1 mov     ss,n04_ss
            mov     sp,n04_sp push    n04_cs
            push    n04_ip sti
            ret     2

;----   active slot 4

OSt_n04_act:

call    OSt_save
            ; restore regs mov     ss,n04_ss
            mov     sp,n04_sp mov     ax,n04_ax
            mov     bx,n04_bx
            mov     cx,n04_cx
            mov     dx,n04_dx
            mov     es,n04_es
            mov     di,n04_di
            mov     si,n04_si
            mov     bp,n04_bp
            mov     ds,n04_ds       ;must be last iret OSt_slot_end:

;----   exit mov     ss,cs:OSt_ss_in
            mov     sp,cs:OSt_sp_in mov     ax,cs:ax_in
            mov     ds,cs:ds_in OStimer     iret comment *   endp
_____[procedure]_____
]                                                          ]
 procedure   OSt_save
 purpose
 description
 entry
 exit
 notes
]_____
] *

OSt_save    proc    near
```

```
;       save registers
;       --------------- cmp     OSt_slot_in,0
jne     OSt_save_1 jmp     OSt_save_exit

OSt_save_1:

cmp     OSt_slot_in,01
jne     OSt_save_2 mov     ax,cs:bp_in
        mov     n01_bp,ax mov     ax,cs:si_in
        mov     n01_si,ax mov     ax,cs:di_in
        mov     n01_di,ax mov     ax,cs:es_in
        mov     n01_es,ax mov     ax,cs:ds_in
        mov     n01_ds,ax mov     ax,cs:dx_in
        mov     n01_dx,ax mov     ax,cs:cx_in
        mov     n01_cx,ax mov     ax,cs:bx_in
        mov     n01_bx,ax mov     ax,cs:ax_in
        mov     n01_ax,ax mov     ax,cs:OSt_ss_in
        mov     n01_ss,ax
        mov     ax,cs:OSt_sp_in
        mov     n01_sp,ax jmp     OSt_save_exit OSt_save_2:

cmp     OSt_slot_in,02
jne     OSt_save_3 mov     ax,cs:bp_in
        mov     n02_bp,ax mov     ax,cs:si_in
        mov     n02_si,ax mov     ax,cs:di_in
        mov     n02_di,ax
```

```
                mov     ax,cs:es_in
                mov     n02_es,ax mov     ax,cs:ds_in
                mov     n02_ds,ax mov     ax,cs:dx_in
                mov     n02_dx,ax mov     ax,cs:cx_in
                mov     n02_cx,ax mov     ax,cs:bx_in
                mov     n02_bx,ax mov     ax,cs:ax_in
                mov     n02_ax,ax mov     ax,cs:OSt_ss_in
                mov     n02_ss,ax
                mov     ax,cs:OSt_sp_in
                mov     n02_sp,ax jmp     OSt_save_exit OSt_save_3:

cmp     OSt_slot_in,03
        jne     OSt_save_4 mov     ax,cs:bp_in
                mov     n03_bp,ax mov     ax,cs:ds_in
                mov     n04_ds,ax mov     ax,cs:dx_in
                mov     n04_dx,ax mov     ax,cs:cx_in
                mov     n04_cx,ax mov     ax,cs:bx_in
                mov     n04_bx,ax mov     ax,cs:ax_in
                mov     n04_ax,ax mov     ax,cs:OSt_ss_in
                mov     n04_ss,ax
                mov     ax,cs:OSt_sp_in
                mov     n04_sp,ax OSt_save_exit:

ret

OSt_save        endp comment *
```

```
]_____[procedure]_____]
  procedure    ck_cs
  purpose      check that hardware interrupt 08h occurred
               within an application program
  description ---------------- n01_cs code segment of 1st program loaded valid code segment
        range ---------------- 09FFFh end of programs code segments
  entry
  exit   cf set   if bad cs
         cf clear if good cs
  notes
]_____
] *

;[140]

ck_cs     proc      near push      ds
          push      ax

;----     check for valid cseg mov       ax,seg _DATA
          mov       ds,ax mov       ax,cs:OSt_cs cmp       ax,n01_cs
          jb        cs_bad cmp       ax,09FFFh
          jae       cs_bad pop       ax
          pop       ds
          clc
          ret cs_bad:   pop       ax
          pop       ds
          stc
          ret ck_cs     endp end       init             ;dos loader entry
```

Although the invention has been described with reference to a preferred embodiment, it will be understood by those skilled in the art that various changes in form and detail may be made therein without departing from the spirit and scope of the present invention.

What is claimed is:

1. In a computer having a processor and a system memory, a method of real-time concurrent processing in which time-sliced task switching occurs responsive to an interrupt timer of said computer among multiple independent reentrant programs and other independent nonreentrant programs all stored in said system memory, said method comprising the computer-implemented steps of:

storing a set of code segment and instruction pointer parameters for each of said reentrant programs in a look-up table of said memory;

comparing in said processor the code segment and instruction pointer parameters of said reentrant or nonreentrant program currently executing in said processor with said stored code segment and instruction pointer parameters; and switching said processor from execution of said currently executing program to execution of a next reentrant or nonreentrant program responsive to said interrupt timer if the program segment and instruction pointer parameters of said currently executing program match with any one set of said stored code segment and instruction pointer parameters, such that said switching from execution responsive to said interrupt timer is permitted prior to completion of said program tasks only for said reentrant programs.

2. The method according to claim 1 further comprising the computer-implemented step of:

saving in said system memory the current program code segment and instruction pointer parameters of said current executing program upon switching to said next reentrant or nonreentrant program, such that when said currently executing program is again executed, execution occurs starting from the next instruction following that last executed.

3. In a computer having a processor and a memory, a method of real-time concurrent progressing in which time-sliced task switching occurs responsive to an interrupt timer of said computer among multiple independent reentrant programs and other independent nonreentrant programs all stored in said memory, each said program including a program segment prefix also stored in said memory, said method comprising the computer-implemented steps of:

storing a set of code segment and instruction pointer parameters for each of said reentrant programs in a look-up table of said memory during loading of said programs;

storing in a look-up table of said memory said program segment prefix for the last of said reentrant programs to be loaded;

comparing in said processor the code segment and instruction pointer parameters of said reentrant or nonreentrant program currently executing in said processor with said stored code segment and instruction pointer parameters;

comparing in said processor the program segment prefix currently associated with said currently executing program with said stored program segment prefix; and switching said processor from execution of the program currently executing in said processor to execution of the next said reentrant or nonreentrant program responsive to said interrupt timer when the code segment and instruction pointer parameters of said currently executing program match with a set of said stored code segment and instruction pointer parameters and when said current program segment prefix matches said stored program segment prefix, such that said switching from execution responsive to said interrupt timer is permitted prior to completion of said program tasks only for said reentrant programs, and only when said current program segment prefix is intact.

* * * * *

UNITED STATES PATENT AND TRADEMARK OFFICE
CERTIFICATE OF CORRECTION

PATENT NO. : 5,210,873

DATED : May 11, 1993

INVENTOR(S) : Kirk W. Gay and Dan Selari

It is certified that error appears in the above-identified patent and that said Letters Patent is hereby corrected as shown below:

Column 4, line 38, change "u it" to --unit--.

Column 5, line 68, change "late" to --later--.

Column 7, line 50, change "structure The" to --structure. The--.

Column 7, line 62, change "versionspecific" to --version-specific--.

In the Claims:

Column 38, line 2, change "progressing" to --processing--.

Signed and Sealed this

Eighth Day of February, 1994

Attest:

BRUCE LEHMAN

*Attesting Officer*    *Commissioner of Patents and Trademarks*